US005974795A

United States Patent [19]

Muraki et al.

[11] Patent Number: 5,974,795

[45] Date of Patent: Nov. 2, 1999

[54] DIESEL ENGINE CONTROLLER

[75] Inventors: Hirotada Muraki, Yokohama; Toshiharu Koganemaru, Hadano, both of Japan

[73] Assignees: Nissan Motor Co., Ltd., Yokohama; Nissan Diesel Motor Co., Ltd., Ageo, both of Japan

[21] Appl. No.: 09/074,409

[22] Filed: May 8, 1998

[30] Foreign Application Priority Data

May 9, 1997 [JP] Japan .................................... 9-119528

[51] Int. Cl.[6] .............................. F01N 7/00; F02D 41/08; B60K 41/12

[52] U.S. Cl. ........................ 60/324; 477/111; 123/339.19

[58] Field of Search ............................ 60/284, 285, 324; 123/339.19, 323; 477/111, 112, 113; 701/103, 104, 110

[56] References Cited

U.S. PATENT DOCUMENTS

| | | | |
|---|---|---|---|
| 4,665,692 | 5/1987 | Inaba | 60/324 |
| 4,707,987 | 11/1987 | Atkin | 60/324 |
| 4,805,571 | 2/1989 | Humphrey | 123/323 |
| 5,279,117 | 1/1994 | Kaiser | 60/324 |
| 5,372,109 | 12/1994 | Thompson et al. | 60/324 |

FOREIGN PATENT DOCUMENTS

| | | |
|---|---|---|
| 5-99010 | 4/1993 | Japan . |
| 5-248301 | 9/1993 | Japan . |

*Primary Examiner*—Willis R. Wolfe
*Attorney, Agent, or Firm*—Foley & Lardner

[57] ABSTRACT

The setting of a continuously variable transmission to a neutral range is detected as a neutral signal. A delayed signal which follows a change of this neutral signal is generated with a delay, and when this delayed signal indicates the neutral range, a target idle rotation speed of a diesel engine is increased. An exhaust throttle is provided to allow the exhaust pressure of an engine to rise in order to raise heating efficiency in the passenger compartment when a vehicle is at rest. By avoiding a delay period from the change of the neutral signal to a change in the delayed signal, torque shock due to the opening or closing of the exhaust throttle is reduced.

9 Claims, 13 Drawing Sheets

| CASE | FIRST SOLENOID VALVE | SECOND SOLENOID VALVE | INTAKE THROTTLE |
|---|---|---|---|
| 1 | CLOSED | CLOSED | FULLY OPEN |
| 2 | OPEN | CLOSED | HALF-OPEN |
| 3 | CLOSED | OPEN | FULLY CLOSED |
| | OPEN | | |

FIG. 3

DIESEL ENGINE CONTROLLER

FIELD OF THE INVENTION

This invention relates to control of exhaust pressure and engine rotation speed in a diesel engine when a passenger compartment of a vehicle equipped with such an engine is heated.

BACKGROUND OF THE INVENTION

It is known that, in a vehicle engine when the transmission is in the neutral position, warm-up time after startup may be shortened by increasing the idle rotation speed compared to the rotation speed when the vehicle is running.

Tokkai Hei 5-99010 published by the Japanese Patent Office in 1993 discloses a method for varying a target idle rotation speed of the engine provided with a continuously variable transmission. The target idle rotation speed is a control target of idle rotation speed. In this prior art device, the target idle rotation speed changes with an appropriate delay with respect to the gear range of the transmission.

When there is a change-over of gear range between an N range and D range, due to the operating delay of the continuously variable transmission, it takes some time until a new relationship between the engine and propeller shaft is set up. If the target idle rotation speed changes during this time period, the engine rotation speed tends to vary excessively, so to avoid this period, the change-over of target idle rotation speed is delayed relative to when the gear range changes over. In this prior art device, the change-over of gear range was detected as a neutral signal which indicates whether or not the engine is connected to the drive shaft, and the target idle rotation speed was made to vary in synchronism with the delayed signal obtained by performing delay processing on the neutral signal.

Tokkai Hei 5-248301 published by the Japanese Patent Office in 1993 discloses that, when a vehicle with a diesel engine is at rest, the engine exhaust pressure is increased, engine working load is increased and engine cooling water temperature is allowed to rise to improve heating performance of a passenger compartment. For this purpose, a throttle is for example provided in an exhaust pipe, and when a warm up switch operated by the driver is switched ON, this exhaust throttle is closed. After the vehicle starts, the exhaust throttle is opened. To determine whether or not the vehicle is at rest, it is determined whether or not the above-mentioned neutral signal is showing the N range. When the engine is at rest, the engine is usually rotating idle or in a state near to this, and when the exhaust throttle is closed, to prevent the engine rotation from becoming unstable due to rise of exhaust pressure, the fuel supply amount to the engine is increased and the target idle rotation speed is increased.

When this exhaust throttle control is used together with idle rotation speed control according to gear range as disclosed in Tokkai Hei 5-99010, and when exhaust throttle control is performed in the aforesaid delay period, the load change of the engine becomes excessive, and torque shock easily occurs due to the opening and closing of the exhaust throttle.

Also, according to experiments performed by the inventors, it was found that when opening and closing of the exhaust throttle was performed in synchronism with the above-mentioned delay signal for idle rotation speed control depending on the gear range, torque shock was not necessarily reduced.

SUMMARY OF THE INVENTION

It is therefore an object of this invention to reduce torque shock due to opening and closing of an exhaust throttle of a diesel engine wherein idle rotation speed control is performed according to the gear range of a continuously variable transmission.

In order to achieve the above objects, this invention provides a controller for use with a vehicle equipped with a diesel engine, a continuously variable transmission and an exhaust throttle for increasing an exhaust pressure of the engine so as to improve heating performance of a passenger compartment of the vehicle.

The controller comprises a sensor for detecting whether or not the transmission lies within a neutral range, and outputting a corresponding neutral sign and a microprocessor.

The microprocessor is programmed to generate a delayed signal which follows the neutral signal with a delay and open or close the exhaust throttle outside a delay period starting from when the neutral signal varies to when the delayed signal varies.

It is preferable that the controller further comprises a fuel injection valve for injecting fuel into the engine according to a predetermined idle target rotation speed and the microprocessor is further programmed to increase the idle target rotation speed when the delayed signal indicates a neutral range.

It is also preferable that the microprocessor is further programmed to open the exhaust throttle when the neutral signal is no longer in the neutral range, and to close the exhaust throttle when the delayed signal has entered the neutral range.

It is also preferable that the microprocessor is further programmed to open the exhaust throttle when the delayed signal is no longer in the neutral range, and to close the exhaust throttle when the neutral signal has entered the neutral range.

When the vehicle comprises a warmup switch for activating a heater in the compartment, it is also preferable that the microprocessor is further programmed to close the exhaust throttle only when the warmup switch is ON.

It is also preferable that the microprocessor is further programmed to increase a fuel injection amount of the fuel injection valve while the exhaust throttle is closed.

It is also preferable that the microprocessor is further programmed to increase the idle target rotation speed while the exhaust throttle is closed.

The details as well as other features and advantages of this invention are set forth in the remainder of the specification and are shown in the accompanying drawings.

BRIEF DESCRIPTION OF THE DRAWINGS

FIG. 3 is a table which compares operating positions of a first solenoid valve and a second solenoid valve with an intake throttle state according to this invention.

DESCRIPTION OF THE PREFERRED EMBODIMENTS

Figure 1:
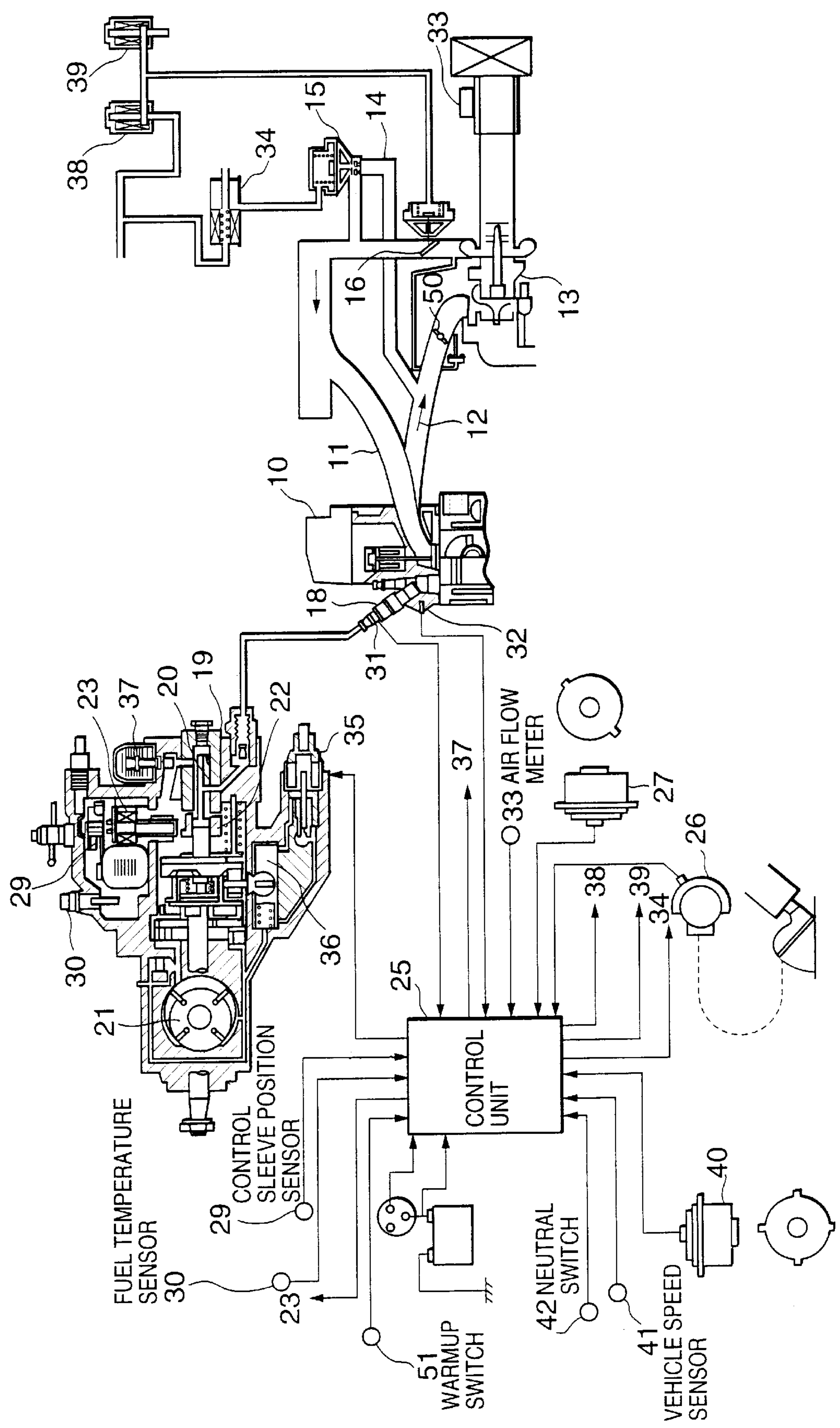
FIG. 1 is a schematic diagram of a diesel engine controller according to this invention.

Referring to FIG. 1 of the drawings, a diesel engine 10 is provided with an intake passage 11 comprising an intake throttle 16 and exhaust passage 12. Intake air in the intake passage 11 is supercharged by a turbocharger 13.

One part of the exhaust in the exhaust passage 12 flows back into the intake passage 11 via an exhaust recirculation passage 14 provided with an exhaust recirculation control valve 15.

A fuel injection valve 18 is provided in a combustion chamber 17 of the engine 10. Fuel is supplied from an electronically controlled fuel injection pump 19 to the fuel injection valve 18.

The fuel injection pump 19 pressure fuel which has been pre-pressurized by a feed pump 21 due to operation of a plunger 20 in synchronism with the engine rotation, and fuel is supplied under pressure to the fuel injection valve 18 of each cylinder of the engine 10 in a predetermined sequence. The fuel injection amount of the fuel injection valve 18 varies according to a position of a control sleeve 22. The position of the control sleeve 22 is varied by a rotary solenoid 23 operated by a signal from a control unit 25.

Signals from an accelerator opening sensor 26 for detecting an accelerator opening, and a pump rotation sensor 40 for detecting a rotation speed of the fuel injection pump 19, are input into the control unit 25. Based on these signals, the control unit 25 calculates a basic fuel injection amount of the fuel injection valve 18.

In order to correct the basic fuel injection amount and to control the exhaust recirculation amount mentioned above, a signal from a TDC sensor 27 for detecting a top dead center position of a piston of each cylinder as well as a rotation speed Ne of the engine 10, a signal from a vehicle speed sensor 41 for detecting a vehicle speed, and a neutral signal from a neutral switch 42 for detecting whether the continuously variable transmission, not shown, is in the neutral position, are input into the control unit 25 as signals representing the running state of the vehicle. Also input are signals from a control sleeve position sensor 29 for measuring a real fuel injection amount of the fuel injection pump 19, fuel temperature sensor 30 for detecting fuel temperature, lift sensor 31 for detecting a lift amount of the fuel injection valve 18, water temperature sensor 32 for detecting an engine cooling water temperature, air flow meter 33 for detecting a mass flowrate of engine intake air, and a warmup switch 51 which commands heating of the passenger compartment.

The control unit 25 controls an opening of a timing control valve 35 so as to control the fuel injection timing according to the running state, and the pressure acting on a timer piston 36 is thereby made to vary. A fuel cut valve 37 is closed in order to prevent fuel leak when the engine has stopped Also, the control unit 25 duty controls a negative pressure control valve 34 which controls a negative pressure used for opening and closing the exhaust recirculation control valve 15.

Figure 2:
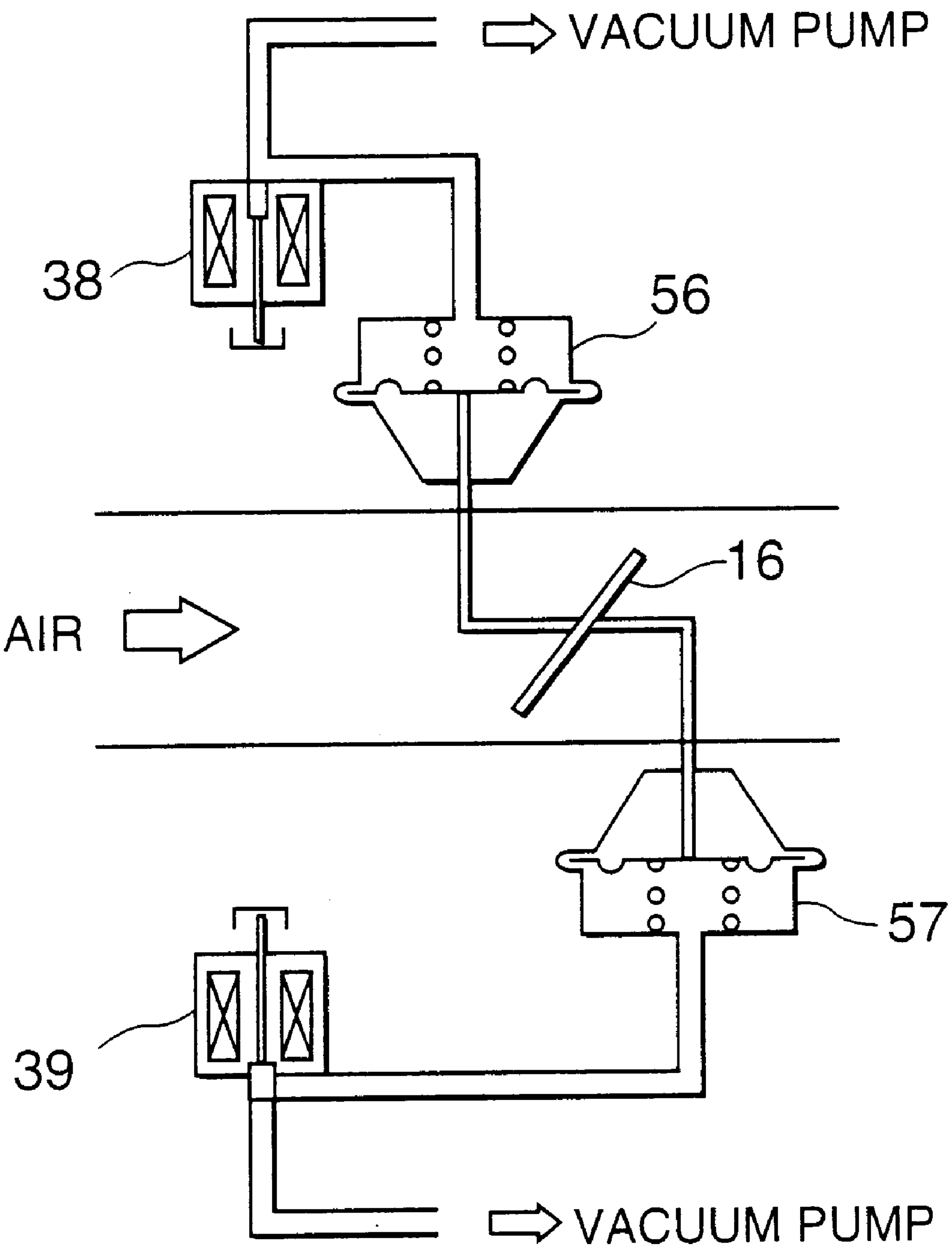
FIG. 2 is a schematic diagram of a throttle drive mechanism according to this invention.

The control unit 25 controls a negative pressure from a vacuum pump used for operating a diaphragm actuator 56 for opening and closing the intake throttle 16 shown in FIG. 2 via a first solenoid valve 38. Exhaust recirculation is performed according to the running state, and, due to this, discharge of nitrogen oxide (NOx) from the engine 1O is reduced.

Further, the control unit 25 controls a negative pressure from the vacuum pump used for operating a diaphragm actuator 57 for opening and closing the intake throttle 16 shown in FIG. 2 via a second solenoid valve 39. The second solenoid valve 39 is operated so that the intake throttle 16 is fully closed when the engine stops.

The solenoid valves 38, 39 have only two positions, i.e. open and closed. By combining these positions, the intake throttle 16 can be put into three states, i.e. fully open (CASE 1), half-open (CASE 2) and fully closed (CASE 3) as shown in FIG. 3. This is achieved by setting the diameters of diaphragms of the diaphragm actuators 56, 57, and the force of a return spring pushing the actuators into the fully open position.

Of the combinations shown in FIG. 3, CASE 1 and CASE 2 are applied in exhaust recirculation, and CASE 3 is applied when the engine has stopped.

A torque of the engine 10 is transmitted to the drive wheels via the continuously variable transmission, not shown. When the transmission is in the N range, the control unit 25 increases the target idle rotation speed of the engine 10 to larger than its value when the transmission is in the D range for traveling. This correction is performed on a signal (referred to hereafter as a delayed signal) obtained by applying a predetermined delay to the neutral signal showing the N range. Herein, the N range means a state where the rotation of the engine 10 is not transmitted to the output shaft of the transmission, and it therefore comprises the parking range in addition to the neutral range. The D range means a state where the rotation of the engine 10 is transmitted to the output shaft of the transmission, and it therefore comprises the reverse range in addition to the drive range.

When the neutral switch 42 is changed over to OFF from ON, the power transmission path of the continuously variable transmission is changed, and there is some delay until load acts on the engine 10. The operating delay period is set according to this delay.

The aforementioned correction of the target idle rotation speed is included in the control of idle rotation speed. In order to achieve the target idle rotation speed, the control unit 25 controls the fuel injection amount.

When the driver switches on the warmup switch 51 in the passenger compartment in the stop state, heating performance is improved by closing the exhaust throttle 50 as in the case of the aforementioned Tokkai Hei 5-248301. The exhaust throttle 50 is situated in the exhaust passage 12 between a branch-off of the exhaust recirculation passage 14 and the turbocharger 13.

The exhaust throttle 50 is opened and closed by a drive device comprising a diaphragm actuator, not shown, and a three-way solenoid valve which selectively supplies atmospheric pressure and intake negative pressure to this diaphragm actuator. The control unit 25 opens and closes the exhaust throttle 50 by a signal output to the three-way solenoid valve.

Herein, the aforementioned delayed signal 18 treated as a first delayed signal, a second delayed signal is generated, and the exhaust throttle is opened and closed according to this second signal. These delayed signals are 1 bit signals having a value of either 0 or 1.

This second delayed signal will now be explained referring to FIGS. 4A–4D.

Figures 4A, 4B, 4C, 4D, 4E, 4F:
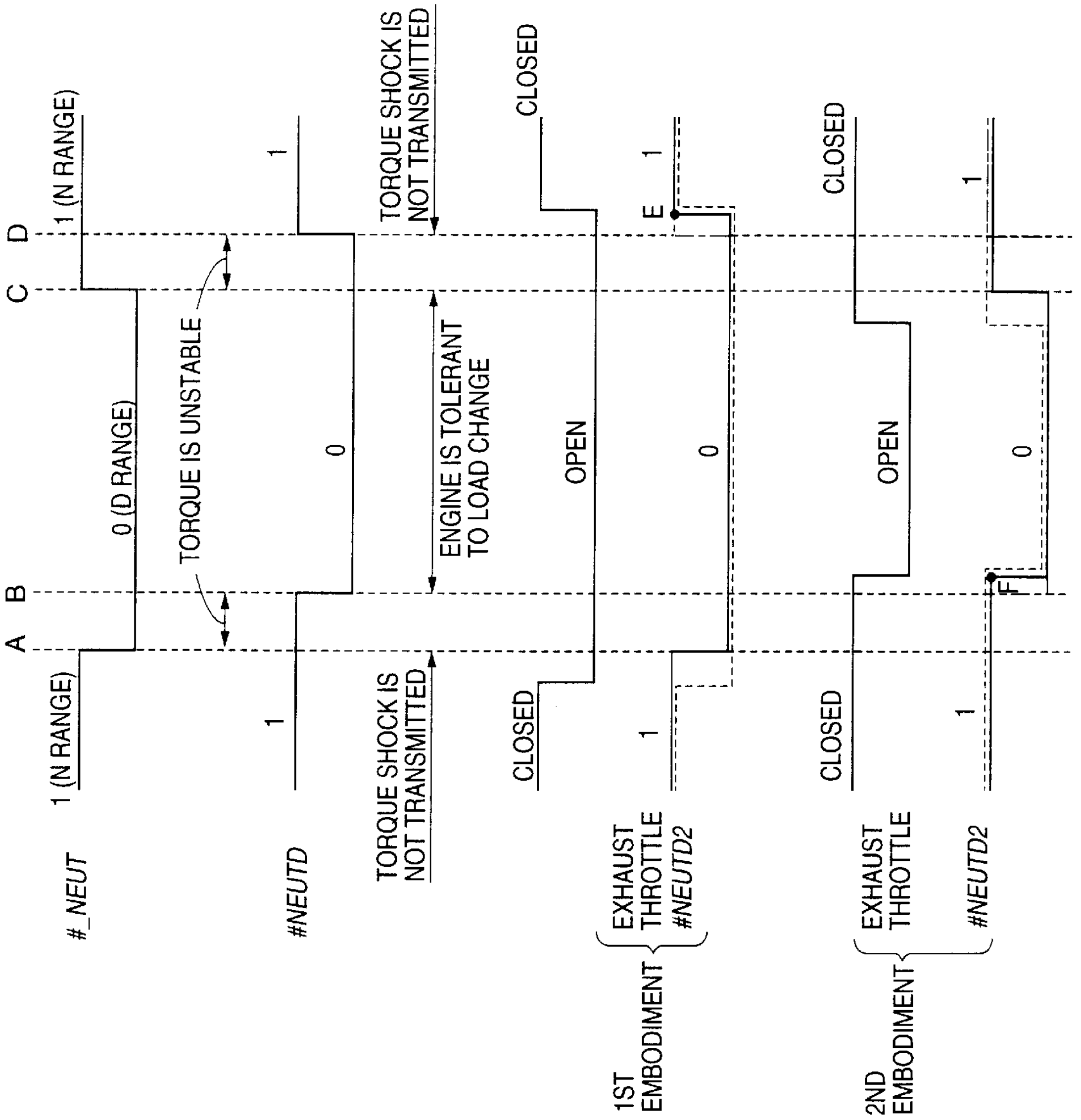
FIGS. 4A–4F are timing charts describing a neutral signal, a first delayed signal #NEUTD, a position of an exhaust throttle and a change of a second delayed signal #NEUTD2 according to a first embodiment and a second embodiment of this invention.

FIG. 4A shows the neutral signal, and FIG. 4B shows the first delayed signal #NEUTD.

When the exhaust throttle 50 is opened and closed during the delay period of the first delayed signal, i.e. during the period A–B and period C–D of FIG. 4A, torque shock may occur because the generated torque of the engine 10 does not become stable during the period A–B and period C–D.

For example, when a load acts on the engine from a power train, i.e., the torque transmitting members from the transmission to the drive wheels, as a result of a change-over of the transmission from the N range to the D range, the engine torque transiently decreases. When the exhaust throttle 50 is opened after engine torque has decreased, the load change due to opening of the exhaust throttle 50 has a large effect on torque, and as a result, torque shock occurs.

According to this invention, opening and closing of the exhaust throttle 50 is performed while avoiding the aforementioned periods. This is achieved by the first embodiment shown in FIG. 4C. or the second embodiment shown in FIG. 4E.

FIG. 4C shows the case where the exhaust throttle 50 is opened and closed before the point A and after the point D. Both these opening and closing timings correspond to the N range. Because the power train is not connected to the engine 10 in the N range, the shock is not transmitted to the vehicle body via the power train even if a change of load occurs in the engine 10.

FIG. 4E shows the case where opening and closing of the exhaust throttle 50 is performed in the period B–C. In the period B–C. the load of the drive system is already acting on the engine 10. Although the period A–B wherein the torque generated in the engine 10 is unstable has ended, the similar unstable period C–D has not yet been reached. In this period B–C, the engine is tolerant to load change.

Specifically, the exhaust throttle 50 is opened and closed according to the timing of the first embodiment when priority is given to making it difficult for load fluctuations to be transmitted to the vehicle body, and the exhaust throttle 50 is open and closed according to the timing of the second embodiment when priority is given to the condition of high tolerance of the engine to load fluctuations.

According to the first embodiment, however, a change-over from the N range to the D range cannot be predicted beforehand. It is therefore desirable that the second delayed signal representing the opening and closing of the exhaust throttle 50 is set to change over from 1 to 0 when the continuously variable transmission changes over from the N range to the D range, and then from 0 to 1 with a predetermined delay relative to the change from 0 to 1 of the first delayed signal#NEUTD, as shown by the solid line in FIG. 4D.

Similarly, according to the second embodiment, a change-over from the D range to the N range cannot be predicted beforehand. It is therefore desirable that the second delayed signal representing the opening and closing of the exhaust throttle 50 is set to change over from 1 to 0 with a predetermined delay relative to the change-over of the first delayed signal #NEUTD from 1 to 0, and then from 0 to 1 when the continuously variable transmission changes over from the D range to the N range, as shown by the solid line in FIG. 4F.

The question of whether the first or second embodiment should be applied depends on the vehicle, and is therefore generally determined by performing the following comparisons.

(1) Comparison of Vibration Due to Opening and Closing of Exhaust Throttle

In the N range, load fluctuations of the engine 10 due to the opening and closing of the exhaust throttle 50 are not transmitted to the vehicle body via the power train, but the engine 10 itself vibrates due to load changes, and this vibration is transmitted to the body via supporting members of the engine. Hence, the vibration of the engine is compared with the vibration of the body. When the latter is less than the former, the first embodiment is applied, and when the latter is greater than the former, the second embodiment is applied.

(2) Comparison of Torque Shock

In the D range, the work of the engine and the transmission is large, so the effect of load change due to opening and closing of the exhaust throttle 50 does not easily appear, and the driver does not easily feel torque shock.

Nevertheless, load changes due to opening and closing of the exhaust throttle 50 are amplified through the transmission, and are easily transmitted to the body via the power train as torque shock. Therefore the first embodiment or second embodiment is selected based on the torque shock which is actually experienced as a criterion.

The aforesaid correction of target idle rotation speed according to gear range is performed in relation to the first delayed signal #NEUTD, but even if opening and closing of the exhaust throttle 50 is performed in relation to the second delayed signal, a small torque shock still occurs. Moreover, if a different change-over timing between the second delayed signal and the first delayed signal #NEUTD is used, the number of torque shocks increases even if the torque shock itself is small. According to the first embodiment, therefore, it is desirable that the point E at which the second delayed signal #NEUTD changes from 0 to 1 is made to approach the point D, so the closing timing of the exhaust throttle 50 is made to coincide with the timing when the first delayed signal #NEUTD changes from 0 to 1 as indicated by the dotted line in FIG. 4D.

Also, according to the second embodiment, it is desirable that the point F at which the second delayed signal changes from 1 to 0, is made to approach the point B, so the opening timing of the exhaust throttle 50 is made to coincide with the timing at which the first delayed signal #NEUTD changes from 1 to 0 as indicated by the dotted line in FIG. 4F.

In this way, the frequency with which torque shocks occur can be reduced.

Next, the control process performed by the control unit 25 will be described referring to the flowcharts.

Figure 5:
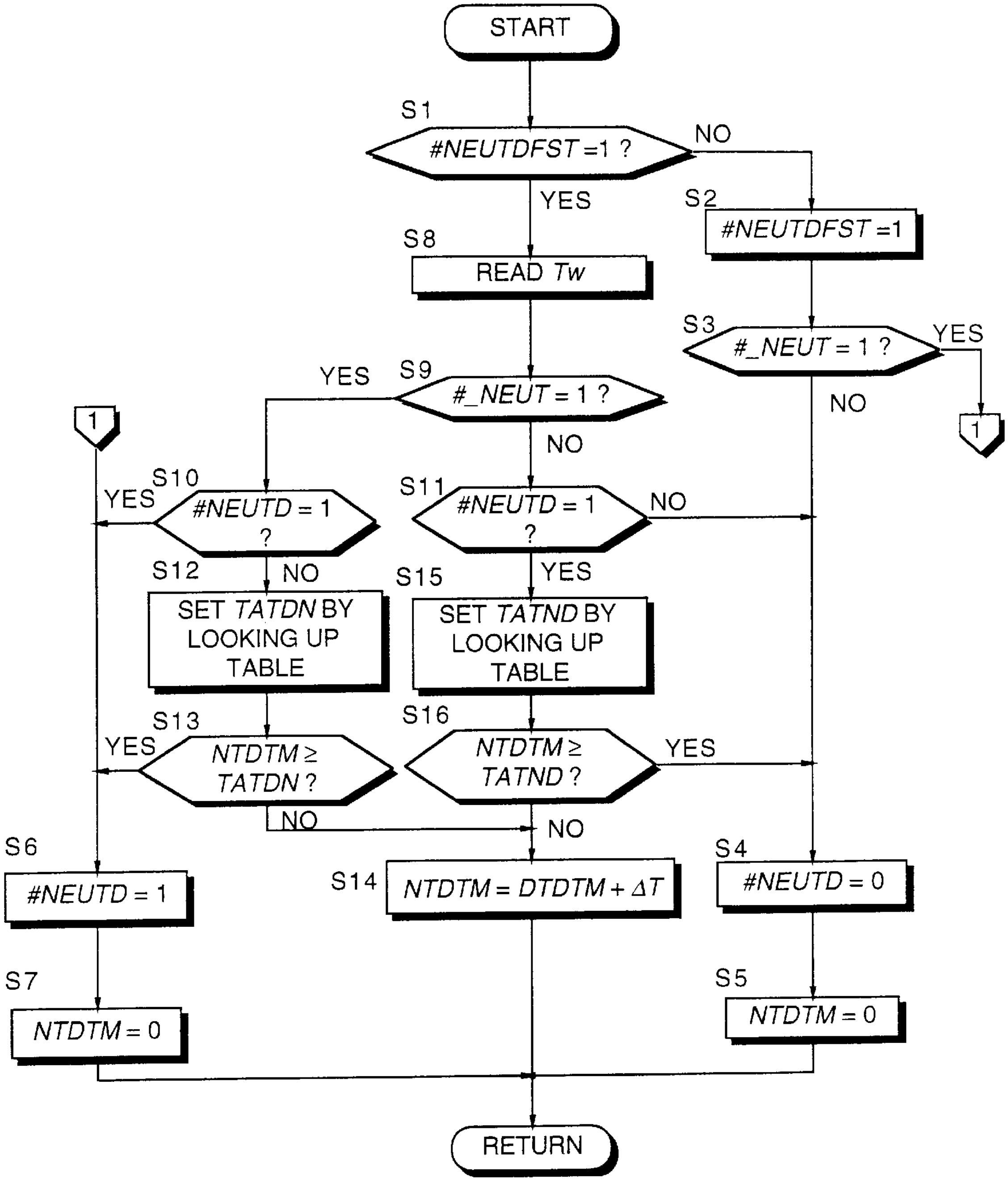
FIG. 5 is a flowchart describing a process for generating the first delayed signal #NEUTD performed by a control unit according to this invention.

The flowchart of FIG. 5 shows the process of generating the first delayed signal #NEUTD. This signal #NEUTD is used for correction of target idle rotation speed according to the gear range of the transmission 6. It is executed at a fixed interval, for example 10 milliseconds.

In a step S1, it is determined whether or not an initial flag #NEUTDFST of the first delayed signal is 1. The initial flag #NEUTDFST is a flag which is initialized to 0 when the engine ignition switch is switched on.

Therefore, on the first occasion after engine startup when the process is performed, this flag #NEUTDFST=0, and in this case the flag #NEUTDFST is set to 1 in a step S2.

In a step S3, it is determined whether or not a sampling value #NEUT of the neutral signal is 1. This sampling value #NEUT is a value obtained by sampling the neutral signal every 2 milliseconds. When the continuously variable transmission is in the N range, #NEUT=1, and when it is in the D range, #NEUT=0.

When the sampling value #NEUT=0, the first delayed signal #NEUTD is set to 0 in a step S4. When the sampling value #NEUT=1. #NEUTD is set to 1 in a step S6.

In this way, the sampling value #NEUT and the first delayed signal #NEUTD are set so that they have the same value on startup of the engine 10.

A timer value NTDTM is also initialized to 0 in a step S5 and S7. As described hereafter, this timer value starts when the sampling value #NEUT changes over from 1 to 0 or from 0 to 1.

As the flag #NEUTDFST was set to 1, on the next and subsequent occasions when the process is executed, a step S8 is performed after the step S1.

In the step S8, the cooling water temperature Tw is read, and is a step S9, it is determined whether or not the sampling value #NEUT=1. In steps S10 and S11, it is determined whether or not the first delayed signal #NEUTD =1.

When there was a change-over to the D range after the engine 10 started up in the N range, #NEUT=0 in the step S9, but #NEUTD=1 in the step S10. In this case, the processing of the step S15 is performed after the processing of the step S11.

In the step S15, a delay time TATND is found from the cooling water temperature Tw by looking up a table (TATND table) of delay time for change-over from the N range to the D range previously built into the control unit 25. The characteristics of this TATND table are determined taking account of the speed with which the engine 10 links with the transmission when there is a change-over from the N range to the D range.

This speed is different depending on the capacity and the turbine shape of a torque converter connecting the engine 10 and the transmission, however qualitatively, it is set so that the delay time is larger the lower the cooling water temperature as disclosed in the aforementioned Tokkai Hei 5-99010.

In a step S16, the timer value NTDTM is compared with the delay time TATND. Immediately after there is a change-over of gear range. NTDTM <TATND, so the routine proceeds to the step S14 and the timer valve NTDTM is incremented.

Figures 7A, 7B, 7C, 7D, 7E, 7F, 7G, 7H:
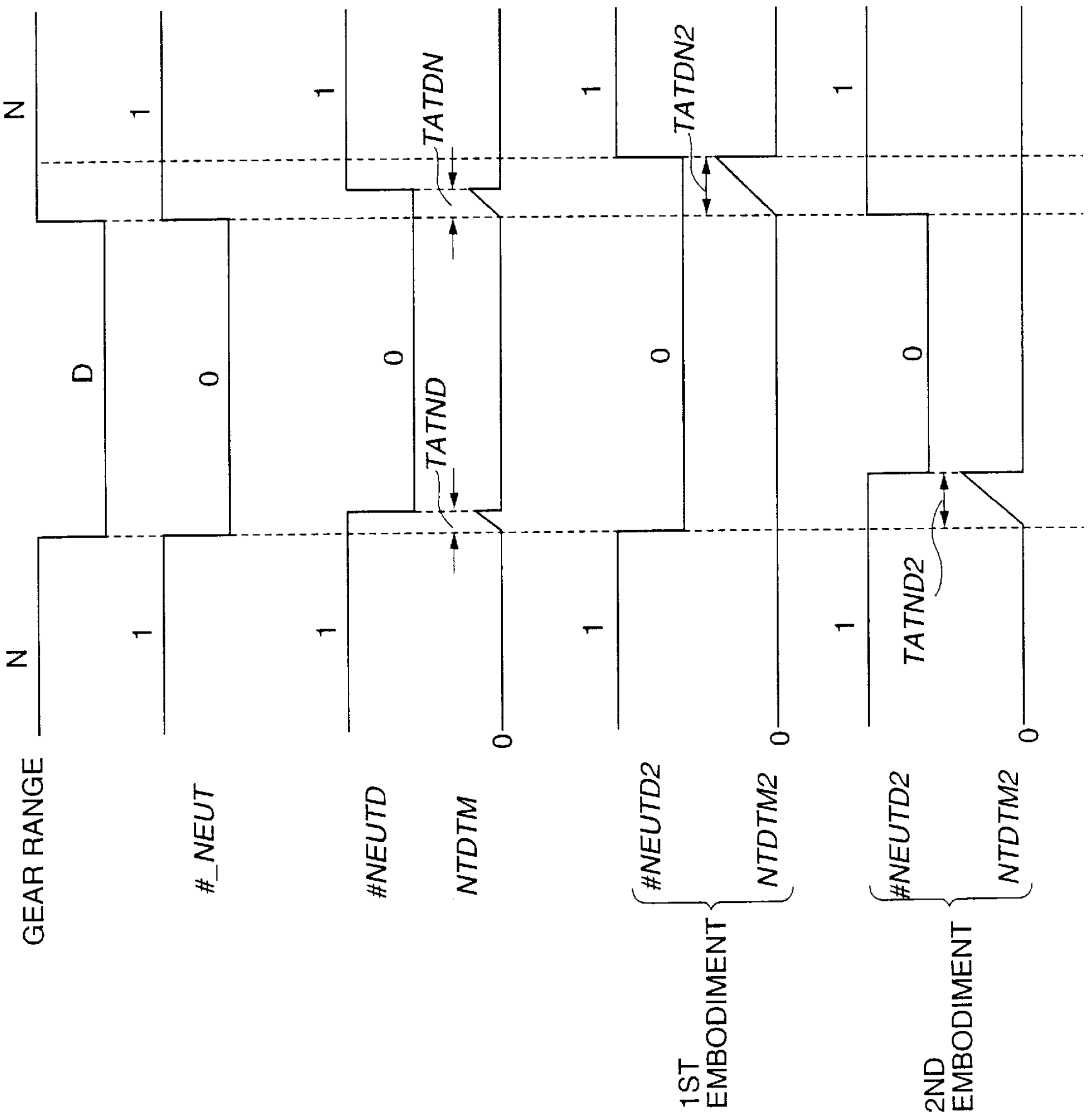
FIGS. 7A–7H are timing charts describing a change of a neutral signal #NEUT, the first delayed signal #NEUTD and the second delayed signal #NEUTD2 according to the first embodiment and the second embodiment of this invention.

When NTDTM>TATND in the step S16, i.e. when the delay time TATND has elapsed from changing over of the gear range, the routine proceeds to the step S4 and S5, the first delayed signal #NEUTD is changed over to 0, and the timer value NTDTM is reset to 0. The first delayed signal #NEUTD therefore changes over from 1 to 0 in the delay time TATND from when there is a change-over from the N range to the D range, as shown in FIG. 7C.

On the other hand, when the first delayed signal #NEUTD is not 1 in the step S11, it shows that the first delayed signal #NEUTD has already changed to 0 after the sampling value #NEUT.

In this case, the routine is terminated via the steps S4 and S5.

When the sampling value #NEUT=1 in the step S9, it is determined whether or not the first delayed signal #NEUTD is 1 in the step S10.

When the first delayed spinal #NEUTD is 0, it signifies that the transmission has just changed over from the D range to the N range.

In this case, a delay time TATDN is found from the cooling water temperature Tw in a step S12 by looking up a table (TATDN table) of delay time for change-over from the D range to the N range previously built into the control unit 25. The characteristics of this TATND table are determined taking account the speed with which the engine 10 is detached from the transmission when there is a change-over from the D range to the N range.

This speed is different depending on the capacity and the turbine shape of the torque converter, however qualitatively, it is set so that the delay time is larger the lower the cooling water temperature.

Next in the step S13, the timer value NTDTM is compared with the delay time TATND. Immediately after there is a change-over of gear range, NTDTM<TATND, so the routine proceeds to the step S14 and the timer value NTDTM is incremented.

When NTDTM>TATND in the step S13, i.e. when the delay time TATND has elapsed from a change-over of gear range, the routine proceeds to the step S6 and S7, the first delayed signal #NEUTD is changed over to 1, and the timer value NTDTM is reset to 0. The first delayed signal #NEUTD therefore changes over from 0 to 1 in the delay time TATND from when there is a change-over from the N range to the D range, as shown in FIG. 7C.

When the first delayed signal #NEUTD is 1 in the step S10, it shows that the first delayed signal #NEUTD has already changed to 1 after the sampling value #NEUT.

In this case, the routine is terminated via the steps S6 and S7.

In synchronism with the change of the first delayed signal #NEUTD thus generated, idle rotation speed control is performed according to gear range as disclosed for example in the aforesaid Tokkai Hei 5-99010.

Figure 6:
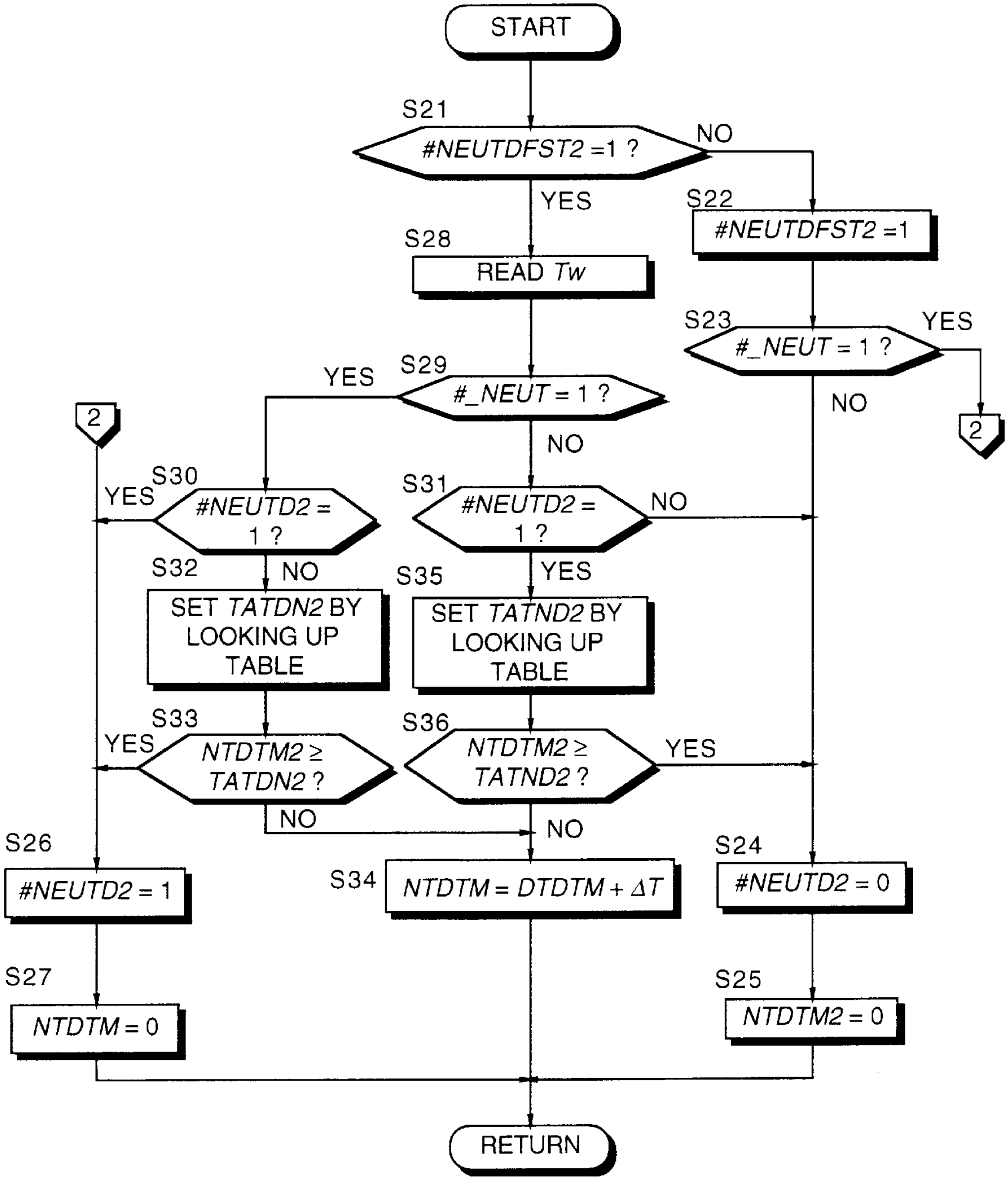
FIG. 6 is a flowchart describing a process for generating the second delayed signal #NEUTD2 performed by the control unit.

The flowchart of FIG. 6 shows the process for generating the second delayed signal #NEUTD2 used for control of the exhaust throttle 50. This process is also performed at a fixed interval, for example 10 milliseconds.

The difference between this flowchart and the flowchart of FIG. 5 for generating the first delayed signal is as follows. Specifically, the flag #NEUTDFST is replaced by a flag #NEUTDFST2, the first delayed signal #NEUTD is replaced by a second delayed signal NEUTD2, the timer value NTDTM is replaced by a timer value NTDTM2, the TATND table is replaced by a TATDN2 table, and the delay time TATDN is replaced by a delay time TATDN2.

The algorithm for this process comprising the steps S21 to S34 is identical to that of the process for generating the first delayed signal comprising the steps S1 to S14, so an explanation of the individual steps of this process will be omitted.

For the aforementioned first embodiment, the second delayed signal #NEUTD2 obtained by this process is shown in FIG. 7E and 7F, and for the second embodiment, the second delayed signal #NEUTD2 obtained by this process is shown in FIG. 7G and 7H.

The flowchart of FIG. 6 may be applied to both the first embodiment and the second embodiment. Specifically, in the case of the first embodiment, the delay time TATND2=0 in the step S35, and in the case of the second embodiment, the delay time TATDN2 is set to 0 in the step S32.

Figure 8:
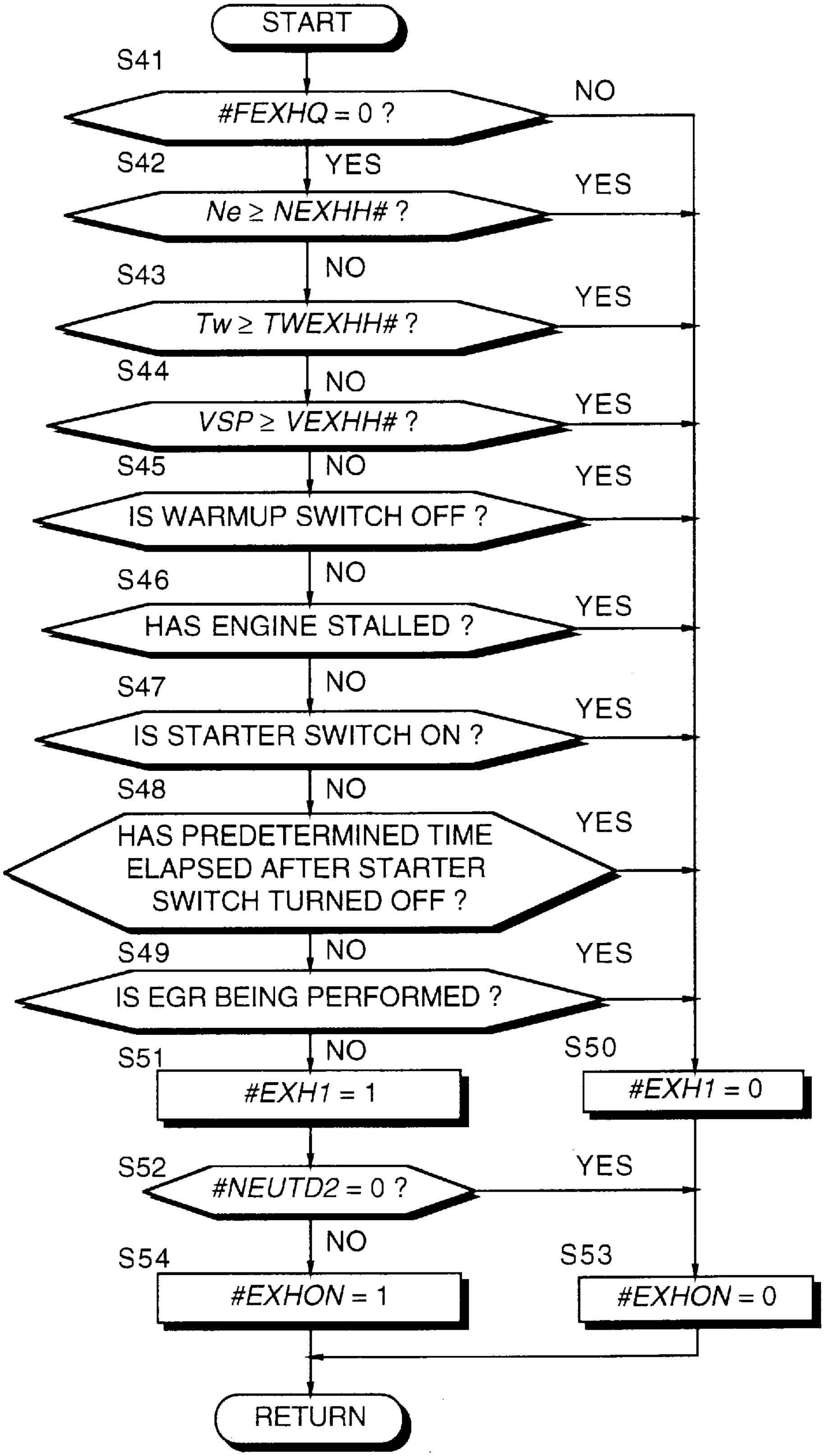
FIG. 8 is a flowchart describing a process for controlling the exhaust throttle performed by the control unit.

The flowchart of FIG. 8 shows the process of controlling the exhaust throttle 50. This process is executed following the process of generating the first delayed signal #NEUTD2 of FIG. 6, and at the same interval.

In a step S41, it is determined whether or not the controller is in a permission region for controlling the exhaust throttle 50 based on a flag #FEXHQ. The flag #FEXHQ is a flag set to 0 in the idle running state and low load regions near to the idle running state, and is set to 1 in all other regions.

Figure 9:
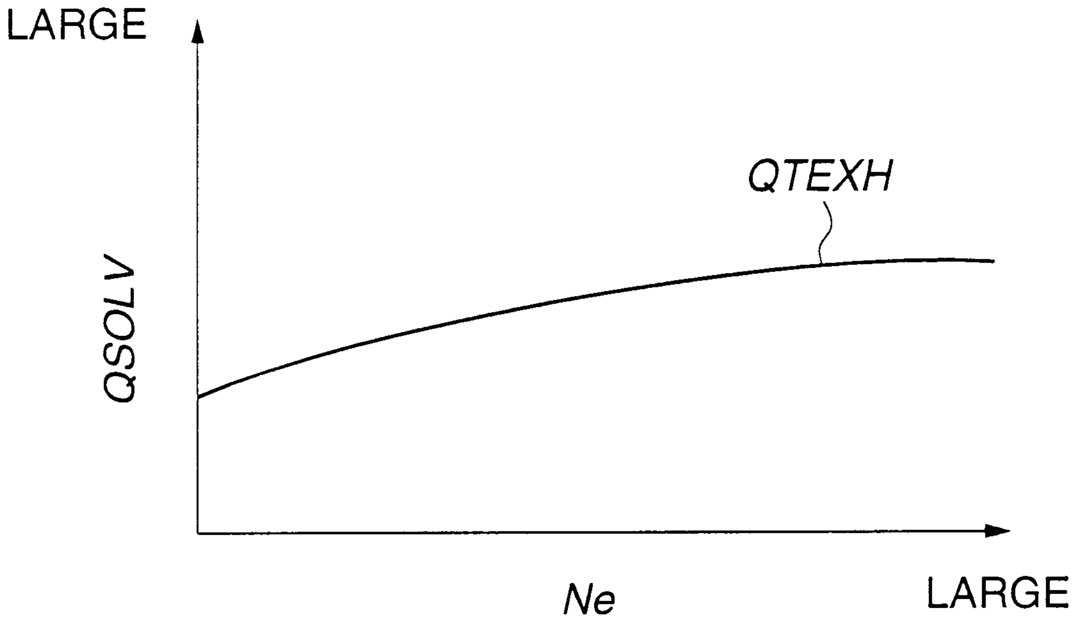
FIG. 9 is a diagram describing the contents of a table of a control region of the exhaust throttle stored by the control unit.

For a given engine rotation speed Ne, the flag #FEXHQ is set to 0 when a target fuel injection amount QSOLV calculated by the control unit 25 is smaller than a determination value QTEXH shown in FIG. 9, and it is set to 1 when the target fuel injection amount QSOLV is greater than QTEXH. To set the flag #FEXHQ, a table corresponding to FIG. 9 is previously stored in the control unit 25. The control unit 25 compares a determination value QTEXH found from this table based on the engine rotation speed Ne with the target fuel injection amount QSOLV, and sets #FEXHQ=1 when QSOLV<QTEXH or #FEXHQ=1 when QSOLV>QTEXH.

When it is determined that FEXHQ=0 in the step S41, i.e. the exhaust throttle 50 is in the control permission region, it is determined in the step S42 and subsequent steps whether or not conditions hold for prohibiting operation of the exhaust throttle 50. If at least one condition of the steps S42–S49 and step S52 holds, the exhaust throttle S0 is fully opened. Operation of the exhaust throttle 50 is permitted only when none of the prohibiting conditions hold. These prohibiting conditions are as follows.

Step S42:

The engine rotation speed Ne is greater than a predetermined value NEXHH#.

Step S43:

The cooling water temperature Tw is greater than a predetermined value TWEXHH#.

Step S44:

The vehicle speed VSP is greater than a predetermined value VEXHH#.

Step S45:

The warmup switch 51 is OFF.

Step S46:

The engine has stopped.

Step S47:

A starter switch is ON.

Step S48:

A predetermined time has not elapsed after the starter switch was switched OFF.

Step S49:

Exhaust recirculation is being performed.

Step S52:

The second delayed signal #NEUTD2=0.

When the transmission is outside the control permission region of the step S41 and any of the conditions corresponding to the steps S42–S49 holds, an exhaust throttle operation prohibition flag #EXH1 is set to 0 in a step S50, and the routine proceeds to a step S53.

When it is determined that exhaust recirculation was not being performed in the step S49, the exhaust throttle operation prohibition flag #EXH1 is set to 1 in the step S51. In the next step S52, the routine proceeds to the step S53 when the second delayed signal #NEUTD2=0.

In the step S53, a solenoid ON flag #EXHON of the exhaust throttle 50 is set to 0 and the process is terminated.

On the other hand, when the second delayed signal #NEUTD2=1 in the step S52, the solenoid ON flag #EXHON is set to 1 in a step S54, and the process is then terminated.

After having executed this process, when the solenoid ON flag #EXHON=0, the control unit 25 outputs an OFF signal to the aforementioned three-way solenoid valve, and the exhaust throttle is fully opened. Also, an ON signal is output to the three-way solenoid valve when the solenoid ON flag #EXHON=1, and the exhaust throttle 50 is closed.

Due to the above process, according to this controller, a second delayed signal #NEUTD2 is generated which is different from the first delayed signal #NEUTD for idle rotation speed control according to the gear range of the automatic transmission, and the exhaust throttle 50 is operated according to this signal #NEUTD2.

In this controller, concerning operation of the exhaust throttle 50, correction of fuel injection amount and increase of idle rotation speed are performed in addition to the aforesaid idle rotation speed control according to a change of gear range. The controls concerning operation of the exhaust throttle 50 are performed in synchronism with a change of the second delayed signal #NEUTD2. However, instead of performing both the fuel increase correction and idle target rotation speed increase, either one of these methods may be used alone.

(1) Fuel Increase Correction

Figure 10:
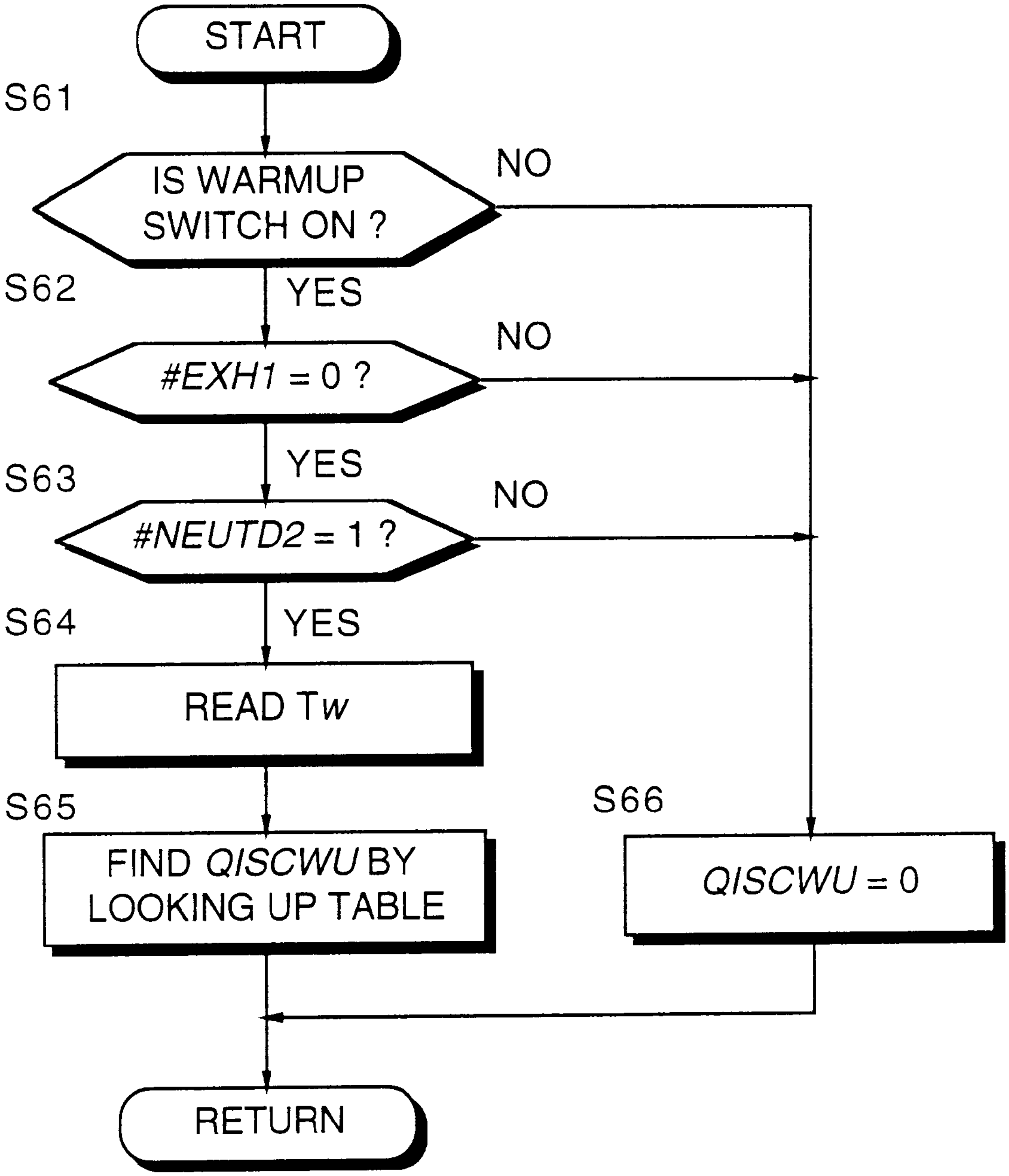
FIG. 10 is a flowchart describing a process for calculating a fuel injection correction amount QISCWU according to the exhaust throttle operation performed by the control unit.

The flowchart of FIG. 10 shows the process of calculating a fuel increase performed by the control unit 25 when the exhaust throttle 50 is fully closed. This process is executed at the same time as the process for controlling the exhaust throttle 50 of FIG. 8 following the process for generating the second delayed signal #NEUTD2 of FIG. 6, and is executed at an interval of, for example, 10 milliseconds.

First, in steps S61–S63, it is determined whether or not the following three conditions hold.

Condition 1:

The warmup switch 51 is ON (step S61).

Condition 2:

The operating prohibition condition flag #EXH1 of the exhaust throttle 50 is 0 (step S62).

Condition 3:

The second delayed signal #NEUTD2=1 (step S63)

When all the aforementioned conditions are met, the routine proceeds to steps S64 and S65.

In the step S64, the cooling water temperature Tw is read, and in a step S65, a table of warmup correction values in idle rotation speed control pre-stored by the control unit 25 is looked up to determine the correction amount QISCWU according to the cooling water temperature TW.

When any of the aforementioned conditions 1–3 is not met, the correction amount QISCWU is set to 0 in the step S66.

Figures 11A, 11B, 11C:
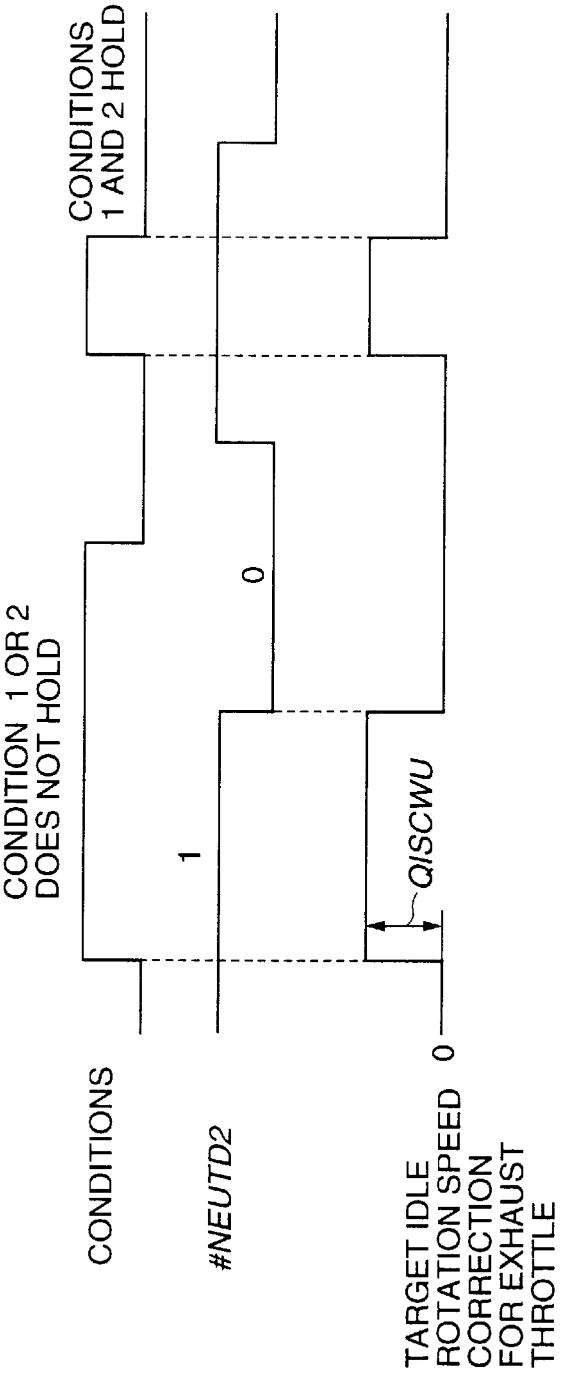
FIGS. 11A–11C are timing charts describing a change of the fuel injection correction amount QISCWU according to this invention.

In other words, provided the conditions 1 and 2 hold as shown in FIG. 11A and the second delayed signal #NEUTD2 is 1 as shown in FIG. 11B, a positive correction amount QISCWU is obtained. Instead of setting QISCWU according to the cooling water temperature Tw in the step S65, it may be set to a fixed value.

The correction amount QISCWU thus determined is treated as one of the load correction amounts for fuel injection control during idle rotation such as the correction amount according to gear range, correction amount for power steering operation, correction amount according to the relay output of a radiator fan and correction amount according to the operation of a glow lamp relay.

These correction amounts are added to the basic injection fuel amount based on engine rotation speed Ne and accelerator opening TVO, and the value after the addition is applied as the target fuel injection amount during idle rotation.

The correction amount according to gear range is computed in the same way as in the aforementioned Tokkai Hei 5-99010 in synchronism with the first delayed signal #NEUTD.

(2) Increase of Target Idle Rotation Speed

This is increase of the target idle rotation speed NSET by a fixed amount when the exhaust throttle 50 is closed.

The target idle rotation speed is based on the cooling water temperature Tw, the first delayed signal #NEUTD, the battery voltage, a signal from the air conditioner switch and a signal from the power steering switch, but when the exhaust throttle 50 is closed this idle target rotation speed is further increased by a fixed quantity.

This increase continues as long as the second delayed signal#NEUTD2 is 1.

Apart from this increasing correction of the target idle, rotation speed, the control unit 25 sets upper and lower limit values of the target idle rotation speed and limits the final target idle rotation speed within these values.

Figure 12:
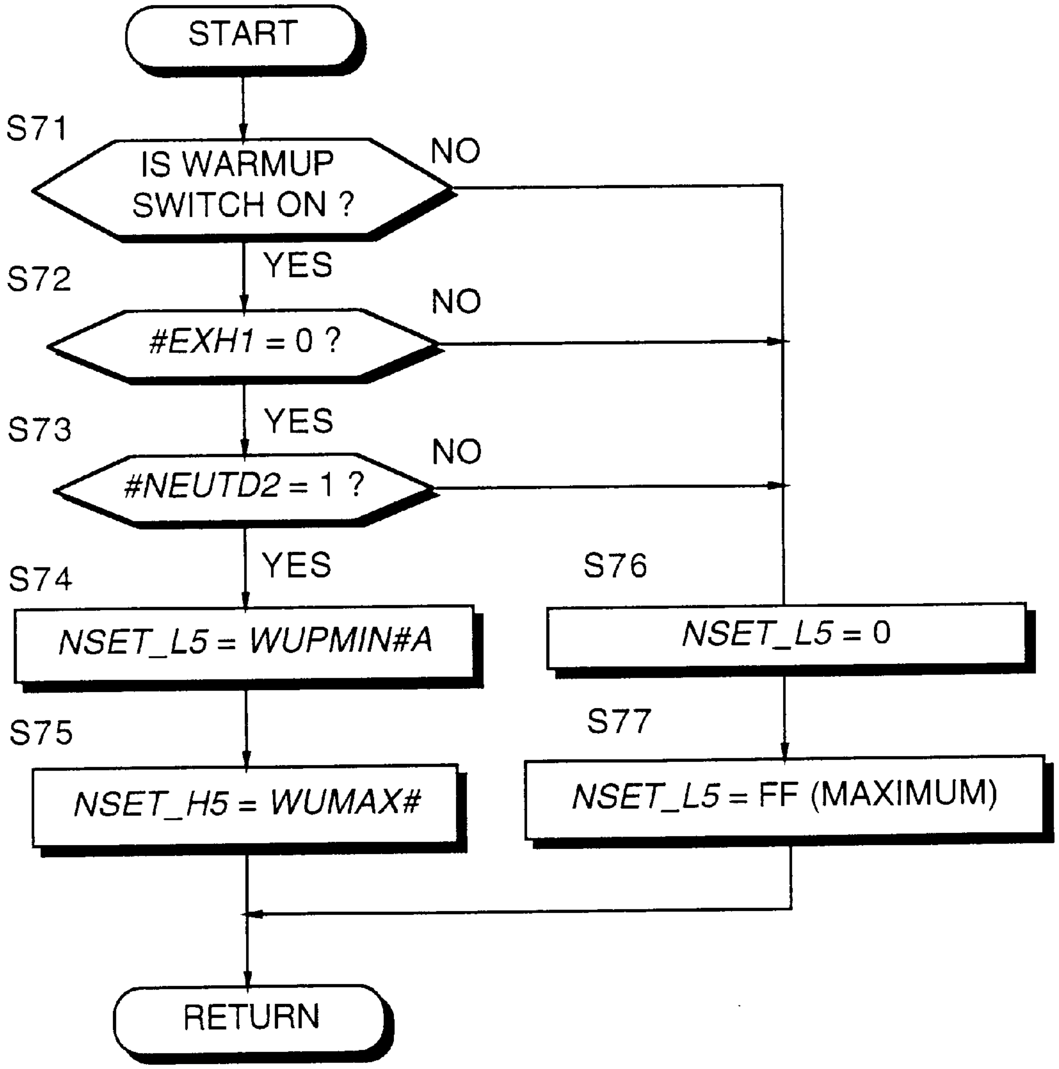
FIG. 12 is a flowchart describing limit processing of a target idle rotation speed NSET performed by the control unit.
Figures 13A, 13B, 13C, 13D, 13E, 13F, 13G:
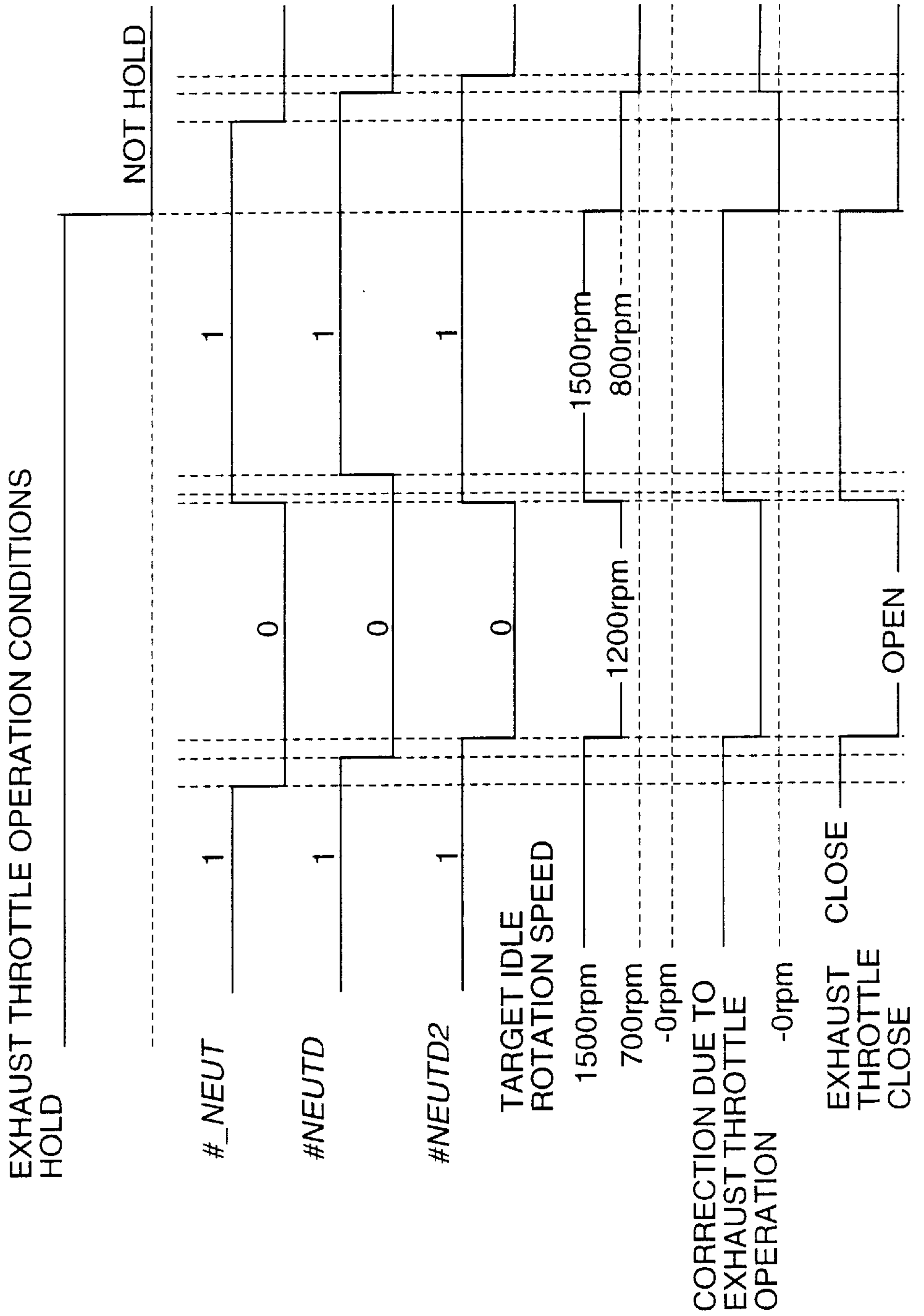
FIGS. 13A–13G are timing charts describing changes of signals, idle rotation speed and exhaust throttle position according to the second embodiment.

The flowchart of FIG. 12 shows this process. This process is performed in parallel with the process of controlling the exhaust throttle 50 shown in FIG. 8, and it is executed at an interval of, for example, 10 milliseconds.

Steps S71–S73 are identical to the steps S61–S63 of FIG. 10. When all the conditions of step S71–S73 are met, the routine proceeds to a step S74, and a lower limit value NSET__L5 of the idle target rotation speed NSET is set to a predetermined value WUPMIN#. For example, WUPMIN# is set to 1150 rpm. In a step S75, an upper limit value NSET__H5 of the idle target rotation speed NSET is set to a predetermined value WUPMAX#. WUPMAX# is set to, for example, 1200 rpm.

When any of the conditions of the steps S71–S73 is not met, the routine proceeds to a step S76, the lower limit NSET__L5 of the idle target rotation speed NSET is set to 0, and an upper limit NSET__H5 of the idle target rotation speed NSET is set to the hexadecimal number FF (256 in decimal notation). This lower limit value is given by a value of 1 byte length in the control unit 25. Therefore FF signifies the maximum value in this range.

The control unit 25 compares the lower limit value NSET__L5 and upper limit value NSET__H5 set in this way with lower limits and upper limits found from other conditions. The maximum of plural lower limit values is set to the lower limit NSET__L. The minimum of plural upper limit values is set to the upper limit NSET__H. The idle rotation speed obtained by applying an increase due to closing the exhaust throttle 50 as described hereabove is then processed using these limit values NSET L and NSET H.

The upper and lower limits found from other conditions are respectively determined according to the aforementioned cooling water temperature Tw, first delayed signal #NEUTD, battery voltage, signal from the air conditioner switch, signal from the power steering switch, etc.

The changes of signals, idle rotation speed and exhaust throttle position according to the second embodiment are shown in FIGS. 13A–13G.

In the above embodiments, the delays #NEUTD and #NEUTD2 were defined as times, but they can for example be defined by number of engine rotations.

The corresponding structures, materials, acts, and equivalents of all means plus function elements in the claims below are intended to include any structure, material, or acts for performing the functions in combination with other claimed elements as specifically claimed. The embodiments of this invention in which an exclusive property or privilege is claimed are defined as follows:

What is claimed is:

1. A controller for use with a vehicle equipped with a diesel engine, an automatic transmission and an exhaust throttle for increasing an exhaust pressure of said engine so as to improve heating performance of a passenger compartment of the vehicle, comprising:

a sensor for detecting whether or not said transmission lies within a neutral range, and outputting a corresponding neutral signal, and a microprocessor programmed to:

generate a delayed signal which follows said neutral signal with a delay, and perform either one of opening and closing operations of said exhaust throttle outside a delay period starting from when said neutral signal varies to when said delayed signal varies.

2. A diesel engine controller as defined in claim 1, wherein said microprocessor is further programmed to open said exhaust throttle when said neutral signal is no longer in said neutral range, and to close said exhaust throttle when said delayed signal has entered said neutral range.

3. A diesel engine controller as defined in claim 1, wherein said microprocessor is further programmed to open said exhaust throttle when said delayed signal is no longer in said neutral range, and to close said exhaust throttle when said neutral signal has entered said neutral range.

4. A diesel engine controller as defined in claim 1, wherein said vehicle comprises a warmup switch for activating a heater in the compartment, and said microprocessor is further programmed to close said exhaust throttle only when said warmup switch is ON.

5. A diesel engine controller as defined in claim 1, wherein said controller further comprises a fuel injection valve for injecting fuel into said engine according to a predetermined idle target rotation speed, and said microprocessor is further programmed to increase said idle target rotation speed when said delayed signal indicates a neutral range.

6. A diesel engine controller as defined in claim 5, wherein said microprocessor is further programmed to increase a fuel injection amount of said fuel injection valve while said exhaust throttle to closed.

7. A diesel engine controller as defined in claim 5, wherein said microprocessor is further programmed to increase said idle target rotation speed while said exhaust throttle is closed.

8. A controller for use with a vehicle equipped with a diesel engine, continuously variable transmission and an exhaust throttle for increasing an exhaust pressure of said engine so as to improve heating performance of a passenger compartment of the vehicle, comprising:

means for detecting whether or not said transmission lies within a neutral range, and outputting a corresponding neutral signal, means for generating a delayed signal which follows said neutral signal with a delay, and means for performing either one of opening and closing operations of said exhaust throttle outside a delay period starting from when said neutral signal varies to when said delayed signal varies.

9. A diesel engine controller as defined in claim 8, wherein said controller further comprises a fuel injection valve for injecting fuel into said engine according to a predetermined idle target rotation speed and means for increasing said idle target rotation speed when said delayed signal indicates a neutral range.

* * * * *